Patented Apr. 22, 1952

2,594,135

UNITED STATES PATENT OFFICE 2,594,135

INDUCING GROWTH OF DORMANT WOODY PLANTS

Frank Earl Denny, Yonkers, N. Y., assignor to Boyce Thompson Institute for Plant Research, Inc., a corporation of New York No Drawing. Application June 28, 1946, Serial No. 680,093

3 Claims. (Cl. 71—2.1)

This invention relates to plant growth and has for its object the provision of an improved material for, and a method of, inducing the growth of dormant woody plants. My invention provides a method of using certain surface active compounds alone or in admixture with other material to induce the growth of woody plants following dormancy.

Trees and shrubs in temperate climates require a period of cold weather during the winter months in order to prepare the buds for renewal of growth in the spring. In the southern part of the United States (and in many other areas in the world, notably in South Africa) the duration of the cold period is too short in some years, or the temperatures reached during the cold season are not low enough, to prepare these trees or shrubs for growth when the warm season sets in. In such years the trees do not bud-out properly, and the term "delayed foliation" has been applied to this condition. The difficulty is particularly serious with peach trees in the southern United States, frequently resulting in a reduced crop for some years or a complete failure in other years. Furthermore, this condition causes trees otherwise large in some sections of the country to be small in the southernmost portion of the country, and restricts the range in which some species can be raised at all.

As a result of my experiments with various plant species including apples, peaches and *Rhodotypos kerrioides*, I have discovered an improved method of treating woody plants to induce their growth, and particularly to start active growth from the dormant period. I have discovered a number of surface-active compounds that have the unexpected property of inducing the growth of dormant woody plants. These compounds may be described generally as high molecular weight organic compounds comprising polymerized aliphatic chains.

One class of compounds which is effective in the method of the invention is the higher sodium alkyl sulfates, such as the product sold under the trade name Tergitol, especially Tergitol Penetrant-4, a compound believed to have the formula

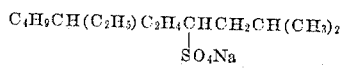

Another compound found to be effective is the oleic ester of polyethylene glycol, known as "400 mono-oleate." The polyethylene glycols have the general formula

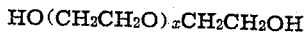

The Tergitol and polyethylene glycol may also be used in diluted form and give especially effective results when dissolved in, say, from one to three parts of a vegetable oil, such as peanut oil.

In the course of my investigations, I have found that ethylene chlorhydrin may be diluted with the aforementioned surface-active compounds to form a product that may be applied effectively to plants as a spray. It is my present belief that certain of the surface-active compounds of my invention not only possess the property of lowering the volatility of ethylene chlorhydrin, thus making it useful as a spray, but actually induce a more pronounced plant growth than ethylene chlorhydrin can exercise alone. The combination of these compounds with ethylene chlorhydrin gives markedly effective results which may be due to synergism or a coaction which accentuates the action of the constituents. Favorable results were also obtained by using dilutions of these chemicals.

Other surface-active compounds have been found which have less marked ability to induce growth when used alone but which greatly enhance the effectiveness of the ethylene chlorhydrin. Typical of such compounds is a product sold under the trade name Areskap which is a monobutyl phenyl phenol sodium monosulfate, and the high molecular weight polyethylene glycols, such as Carbowax 1540. These compounds improve the action of ethylene chlorhydrin.

Ethylene chlorhydrin is toxic to humans and is difficult to use as a spray without injury to the operators and for this reason has previously been used only in closed containers. The surface-active compounds used in accordance with this invention dissolve ethylene chlorhydrin and may be used to dilute the ethylene chlorhydrin to such low concentrations that toxic conditions are greatly minimized. The compounds delay evaporation of the ethylene chlorhydrin and hold it in contact with the plants for longer times greatly increasing the effectiveness notwithstanding the smaller amount used. In carrying out a method of my invention, the surface-active compound may be used in any suitable concentration, in amounts varying, say, from 0.5 part to 3 parts of compound to one part of ethylene chlorhydrin.

In carrying out a method of my invention, it is beneficial to expose the plants to low temperature before applying the chemicals. Temperatures around, say, from 10° C. to 12° C. for periods of 10 to 20 days are sufficient to insure better success, although lower temperatures for longer periods may be used.

I claim:

1. The method of inducing the growth of dormant woody plants which had been exposed while dormant to a temperature less than 12° C. for at least 10 days which comprises applying to the plants while dormant a high molecular weight sodium alkyl sulfate in an amount sufficient to induce growth.

2. The method of inducing the growth of dormant woody plants which had been exposed while dormant to a temperature less than 12° C. for at least 10 days which comprises applying to the plants while dormant a compound represented by the formula

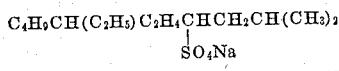

in an amount sufficient to induce growth.

3. The method of inducing the growth of dormant woody plants which had been exposed while dormant to a temperature less than 12° C. for at least 10 days which comprises applying to the plants while dormant an admixture of ethylene chlorhydrin and from 0.5 to 3 parts of a high molecular weight sodium alkyl sulfate per part of ethylene chlorhydrin, the admixture being in an amount sufficient to induce growth.

FRANK EARL DENNY.

REFERENCES CITED

The following references are of record in the file of this patent:

UNITED STATES PATENTS

| Number | Name | Date |
| --- | --- | --- |
| 1,628,035 | Denny | May 10, 1927 |
| 2,166,123 | Boyce | July 18, 1939 |
| 2,260,547 | Valik | Oct. 28, 1941 |
| 2,289,974 | Leiby | July 14, 1942 |
| 2,314,091 | Jones | Mar. 16, 1943 |